(12) United States Patent
Johansen et al.

(10) Patent No.: US 10,102,582 B2
(45) Date of Patent: Oct. 16, 2018

(54) STREAMLINING APPLICATION USING A SOCIAL NETWORK PLATFORM

(71) Applicant: Bank of America Corporation, Charlotte, NC (US)

(72) Inventors: Joseph Neil Johansen, Rock Hill, SC (US); Anthony David Guido, Corona, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 452 days.

(21) Appl. No.: 14/657,662

(22) Filed: Mar. 13, 2015

(65) Prior Publication Data

US 2016/0267597 A1    Sep. 15, 2016

(51) Int. Cl.
*G06Q 40/00* (2012.01)
*G06Q 40/06* (2012.01)
*G06Q 50/00* (2012.01)

(52) U.S. Cl.
CPC .............. *G06Q 40/06* (2013.01); *G06Q 40/00* (2013.01); *G06Q 50/01* (2013.01)

(58) Field of Classification Search
CPC ......... G06Q 40/00; G06Q 20/10; G06Q 50/01
USPC .............................................. 705/35, 39, 40
See application file for complete search history.

(56) References Cited

U.S. PATENT DOCUMENTS

| | | |
|---|---|---|
| 5,644,727 A | 7/1997 | Atkins |
| 5,799,287 A | 8/1998 | Dembo |
| 6,012,397 A | 1/2000 | Krahl et al. |
| 6,601,044 B1 | 7/2003 | Wallman |
| 6,996,539 B1 | 2/2006 | Wallman |
| 7,062,458 B2 | 6/2006 | Maggioncalda et al. |
| 7,069,197 B1 | 6/2006 | Saidane |
| 7,340,534 B2 | 3/2008 | Cameron et al. |
| 7,490,050 B2 | 2/2009 | Grover et al. |
| 7,577,597 B1 | 8/2009 | Allison et al. |
| 7,630,986 B1 | 12/2009 | Herz et al. |
| 7,689,494 B2 | 3/2010 | Torre et al. |
| 7,734,539 B2 | 6/2010 | Ghosh et al. |

(Continued)

OTHER PUBLICATIONS

Terri Bradford, Where Social Networks, Payments and Banking Intersect, Dec. 2012, Federal Reserve Bank of Kansas City, 2-5 (Year: 2012).*

(Continued)

*Primary Examiner* — I Jung Liu
(74) *Attorney, Agent, or Firm* — Michael A. Springs; Moore & Van Allen PLLC; Anup Shrinivasan

(57) ABSTRACT

Embodiments of the invention are directed to systems, methods and computer program products for use in streamlining customer finance and customer money management platforms. An exemplary apparatus may be configured to provide a financial management application, whereby the financial management application interfaces with an online banking platform to access a customer's financial information for use in streamlining the customer's finances and money management strategies; receive social network financial information, the social network financial information comprising financial information associated with other customers; compare the customer's financial information to the social network financial information; present a comparison of the customer's financial information to the social network financial information.

20 Claims, 7 Drawing Sheets

(56) References Cited

U.S. PATENT DOCUMENTS

| | | |
|---|---|---|
| 7,783,545 B2 | 8/2010 | Sloan et al. |
| 7,788,146 B2 | 8/2010 | McCarthy, Jr. |
| 7,895,102 B1 | 2/2011 | Wilks et al. |
| 7,921,048 B2 | 4/2011 | Sloan et al. |
| 7,983,979 B2 | 7/2011 | Holland, IV |
| 8,065,227 B1 | 11/2011 | Beckman |
| 8,090,656 B2 | 1/2012 | Solomon et al. |
| 8,243,074 B1 | 8/2012 | Kilat et al. |
| 8,341,057 B1 | 12/2012 | Wagner et al. |
| 8,417,608 B2 | 4/2013 | Benefield et al. |
| 8,463,703 B1 | 6/2013 | Bloomquist et al. |
| 8,473,380 B2 | 6/2013 | Thomas et al. |
| 8,478,691 B2 | 7/2013 | Solomon et al. |
| 8,533,092 B1 | 9/2013 | Burrow et al. |
| 8,577,764 B2 | 11/2013 | Weigman et al. |
| 8,606,678 B2 | 12/2013 | Jackowitz et al. |
| 8,606,708 B1 | 12/2013 | Homier et al. |
| 8,620,785 B1 | 12/2013 | Wilks et al. |
| 8,635,132 B1 | 1/2014 | Wilks et al. |
| 8,682,753 B2 | 3/2014 | Kulathungam |
| 8,706,590 B2 | 4/2014 | Benefield et al. |
| 8,744,899 B2 | 6/2014 | Rose et al. |
| 8,751,356 B1 | 6/2014 | Garcia |
| 8,762,194 B2 | 6/2014 | Rose et al. |
| 8,812,379 B2 | 8/2014 | Torre et al. |
| 8,838,498 B2 | 9/2014 | Ross |
| 8,862,512 B2 | 10/2014 | Joa et al. |
| 8,903,739 B1 | 12/2014 | Janiczek |
| 9,349,035 B1 | 5/2016 | Gerber et al. |
| 2002/0130868 A1 | 9/2002 | Smith |
| 2003/0177044 A1 | 9/2003 | Sokel et al. |
| 2004/0039688 A1 | 2/2004 | Sulkowski et al. |
| 2004/0054610 A1 | 3/2004 | Amstutz et al. |
| 2005/0004855 A1 | 1/2005 | Jenson et al. |
| 2005/0097033 A1 | 5/2005 | Pretell et al. |
| 2005/0159996 A1 | 7/2005 | Lazarus et al. |
| 2005/0267816 A1 | 12/2005 | Jaramillo |
| 2005/0289045 A1 | 12/2005 | Lawson |
| 2006/0010057 A1 | 1/2006 | Bradway et al. |
| 2006/0155639 A1 | 7/2006 | Lynch et al. |
| 2007/0027736 A1 | 2/2007 | Reynolds et al. |
| 2007/0192457 A1 | 8/2007 | Ervin |
| 2007/0244741 A1 | 10/2007 | Blume et al. |
| 2008/0091459 A1 | 4/2008 | Elgar et al. |
| 2008/0201230 A1 | 8/2008 | Hardison |
| 2008/0208677 A1 | 8/2008 | Mayr et al. |
| 2008/0244429 A1 | 10/2008 | Stading |
| 2009/0055327 A1 | 2/2009 | Jones et al. |
| 2009/0132559 A1 | 5/2009 | Chamberlain et al. |
| 2009/0157811 A1 | 6/2009 | Bailor et al. |
| 2009/0271248 A1 | 10/2009 | Sherman et al. |
| 2009/0307088 A1 | 12/2009 | Littlejohn |
| 2010/0094740 A1 | 4/2010 | Richter |
| 2010/0179920 A1 | 7/2010 | Snodgrass |
| 2010/0248192 A1 | 9/2010 | Thompson et al. |
| 2010/0280935 A1 | 11/2010 | Fellowes et al. |
| 2010/0293450 A1 | 11/2010 | Ratkowski et al. |
| 2011/0178910 A1 | 7/2011 | Benefield et al. |
| 2012/0005053 A1 | 1/2012 | Burgess et al. |
| 2012/0030099 A1 * | 2/2012 | Marshall ............... G06Q 40/00 705/40 |
| 2012/0197689 A1 | 8/2012 | Hunter et al. |
| 2012/0216175 A1 | 8/2012 | Ross |
| 2012/0233015 A1 * | 9/2012 | Calman ............... G06Q 30/0633 705/26.8 |
| 2013/0030887 A1 | 1/2013 | Calman et al. |
| 2013/0030888 A1 | 1/2013 | Calman et al. |
| 2013/0036038 A1 | 2/2013 | Nisal et al. |
| 2013/0054314 A1 | 2/2013 | Ross et al. |
| 2013/0060617 A1 | 3/2013 | Ross et al. |
| 2014/0067656 A1 * | 3/2014 | Cohen Ganor ........ G06Q 30/00 705/39 |
| 2014/0081817 A1 | 3/2014 | Secrist et al. |
| 2014/0136381 A1 | 5/2014 | Joseph et al. |
| 2014/0164086 A1 | 6/2014 | Coffman et al. |
| 2014/0172559 A1 | 6/2014 | Calman et al. |
| 2014/0236673 A1 * | 8/2014 | Smith ..................... H04L 67/22 705/7.29 |
| 2014/0258023 A1 | 9/2014 | Joa et al. |
| 2014/0279409 A1 | 9/2014 | Grigg et al. |
| 2014/0279505 A1 | 9/2014 | Grigg et al. |
| 2014/0279799 A1 | 9/2014 | Thomas et al. |
| 2014/0310142 A1 | 10/2014 | Mak |
| 2014/0358682 A1 | 12/2014 | Blackhurst et al. |
| 2015/0339363 A1 | 11/2015 | Moldoveanu et al. |
| 2016/0027102 A1 | 1/2016 | Smith et al. |

OTHER PUBLICATIONS

Extended European Search Report dated Jan. 29, 2010 for European Patent Application EP 09 25 2414.9; 11 pages.

"Linking Perceived Value and Loyalty in Location-based Mobile Services"; Pura, Minna, Managing Service Quality 15, 6 (2005); 509-538.

* cited by examiner

STREAMLINING APPLICATION USING A SOCIAL NETWORK PLATFORM

BACKGROUND

Existing banking applications provide snapshots of a customer's financial information. However, there is not much integration between such banking applications and other applications (e.g., social network applications) and/or data of a customer. There exists a need for streamlining a customer's financial information with other information and/or applications of a customer so that a customer can better understand the customer's financial position.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention are directed to systems, methods, and computer program products for streamlining customer finance and customer money management platforms and providing electronic financial management. An exemplary apparatus may comprise a memory; a computing processor; and a module stored in the memory, said module comprising instruction code executable by one or more computing processors, and configured to cause the one or more computing processors to provide a financial management application, whereby the financial management application interfaces with an online banking platform to access a customer's financial information for use in streamlining the customer's finances and money management strategies; receive a request to process a simulated investment, via the financial management application, wherein the request specifies a virtual investment amount and one or more financial products; in response to receiving the request to process a simulated investment, execute a simulation algorithm, wherein the simulated algorithm calculates the effect of virtual investment amount on the one or more financial products; and display the calculated effect of depositing the virtual investment amount into the one or more financial products.

Embodiments of the invention are directed to systems, methods, and computer program products for streamlining customer finance and customer money management platforms and providing financial decision simulations. An exemplary apparatus may comprise a memory; a computing processor; and a module stored in the memory, said module comprising instruction code executable by one or more computing processors, and configured to cause the one or more computing processors to provide access to a financial management dashboard, whereby the financial management dashboard interfaces with an online banking platform to access a customer's financial information for use in streamlining the customer's finances and money management strategies; present, via the financial management application dashboard, a holistic financial view of the customer, wherein the holistic financial view of the customer comprises one or more financial parameters associated with the customers current finances, and wherein the financial management application dashboard comprises at least one adjustment device for altering the one or more financial parameters associated with the customers finances; in response to the customer adjusting the at least one financial parameter, execute a simulation algorithm, wherein the simulation algorithm calculates the effect of the adjustment of the at least one financial parameter on the customers current finances; and present, via the financial management application dashboard, an updated holistic financial view of the customer, wherein the updated holistic financial view of the customer comprises one or more financial parameters associated with the customers future finances based at least in part on the calculated the effect of the adjustment of the financial parameter on the customers current finances.

Embodiments of the invention are directed to systems, methods, and computer program products for streamlining customer finance and customer money management platforms and providing a comparison based on a social network platform. An exemplary method comprises providing a financial management application, whereby the financial management application interfaces with an online banking platform to access a customer's financial information for use in streamlining the customer's finances and money management strategies; receiving social network financial information, the social network financial information comprising financial information associated with other customers; comparing the customer's financial information to the social network financial information; presenting a comparison of the customer's financial information to the social network financial information.

Embodiments of the invention are directed to systems, methods, and computer program products for streamlining customer finance and customer money management platforms and providing incentives based on customer money management trends. An exemplary method comprises providing a financial management application, whereby the financial management application interfaces with an online banking platform to access a customer's financial information for use in streamlining the customer's finances and money management strategies; determining at least one goal associated with the customer; tracking progression towards the at least one goal; and providing at least one incentive to the customer based on achievement of the at least one goal.

Embodiments of the invention are directed to systems, methods, and computer program products for streamlining customer finance and customer money management platforms and providing a financial institution product based on customer money management trends. An exemplary method comprises providing a financial management application, whereby the financial management application interfaces with an online banking platform to access a customer's financial information for use in streamlining the customer's finances and money management strategies; receiving social network financial information, the social network financial information comprising financial information associated with other customers; comparing the customer's financial information to the social network financial information; and presenting a comparison of the customer's financial information to the social network financial information.

The features, functions, and advantages that have been discussed may be achieved independently in various embodiments of the present invention or may be combined with yet other embodiments, further details of which can be seen with reference to the following description and drawings. Additionally, as will be appreciated by one of ordinary skill in the art, the features, functions, and advantages that have been discussed may include and/or be embodied as an apparatus (including, for example, a system, machine, device, computer program product, and/or the like), as a method (including, for example, a business method, computer-implemented process, and/or the like), or as any combination of the foregoing.

BRIEF DESCRIPTION OF THE DRAWINGS

Figure 1:
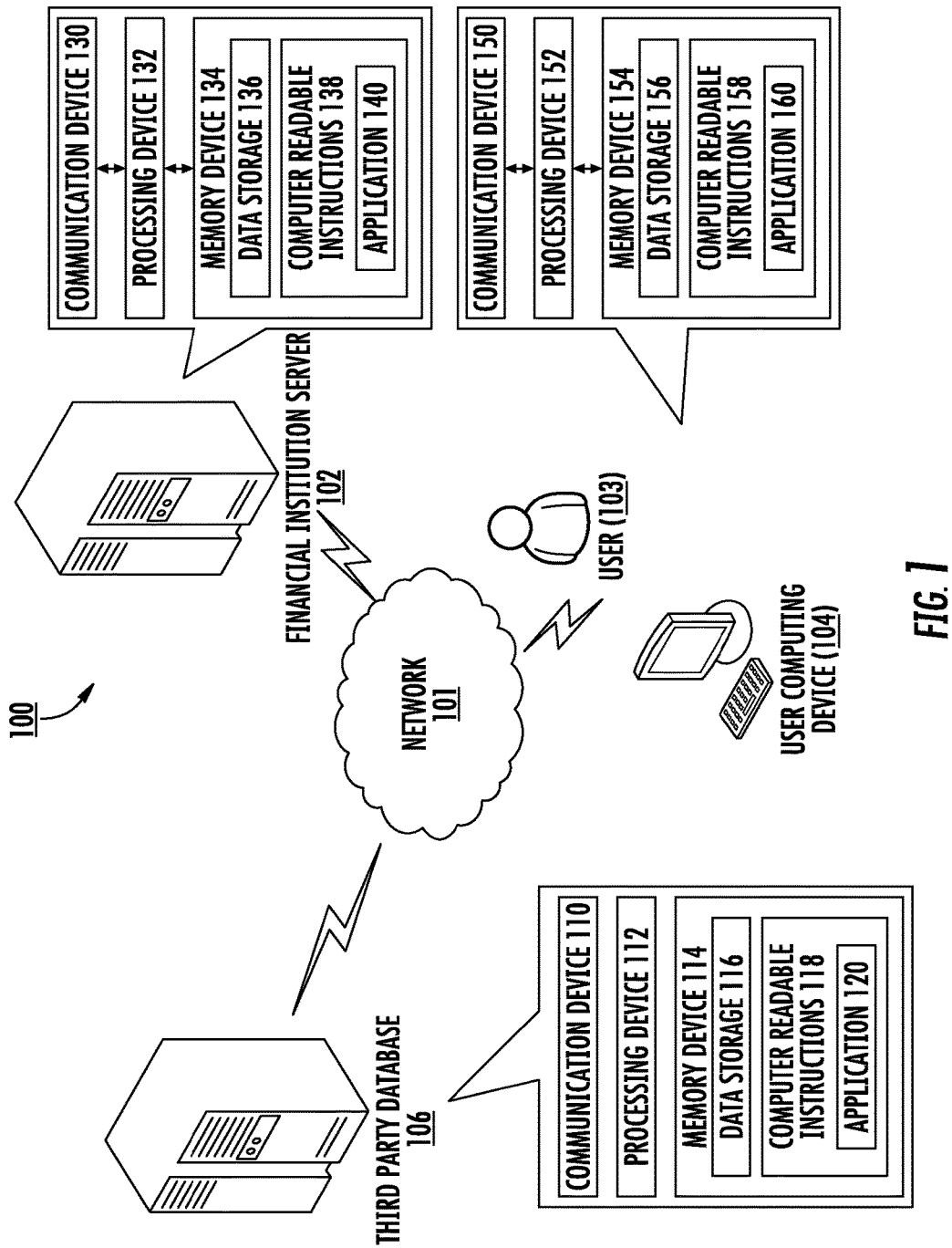
Figure 2:
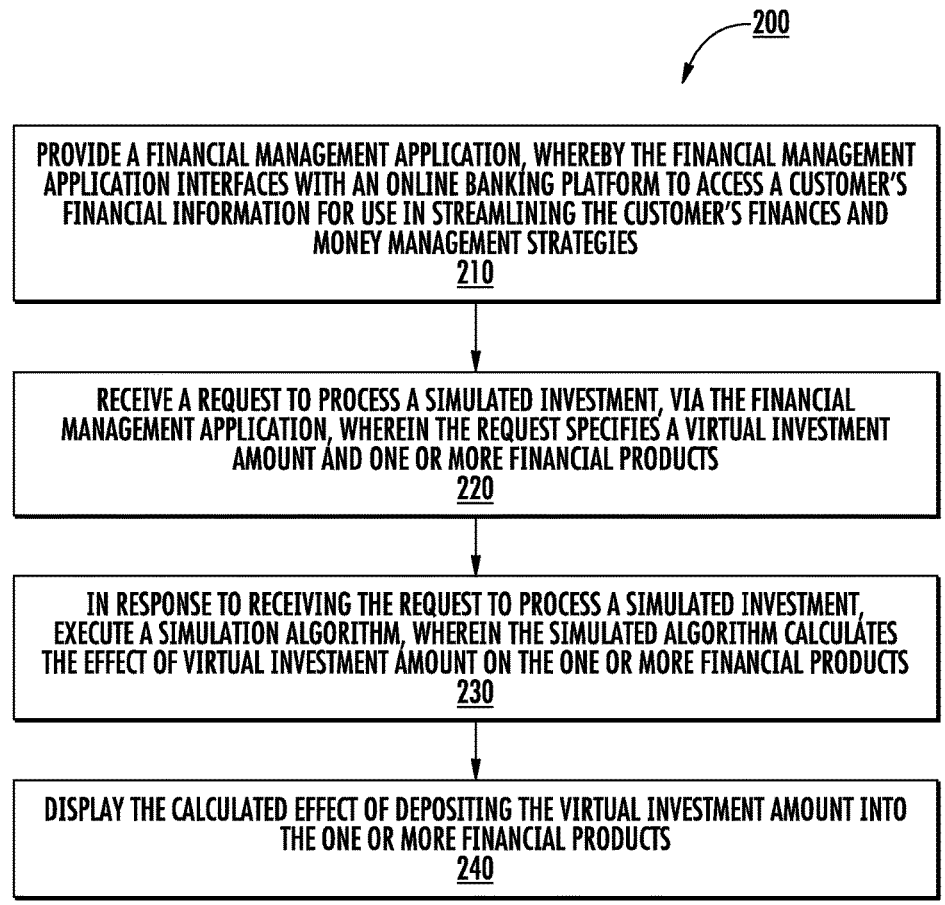
Figure 3:
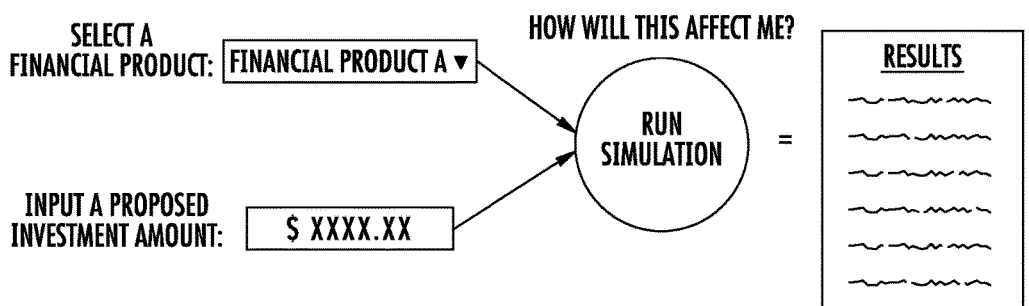
Figure 4:
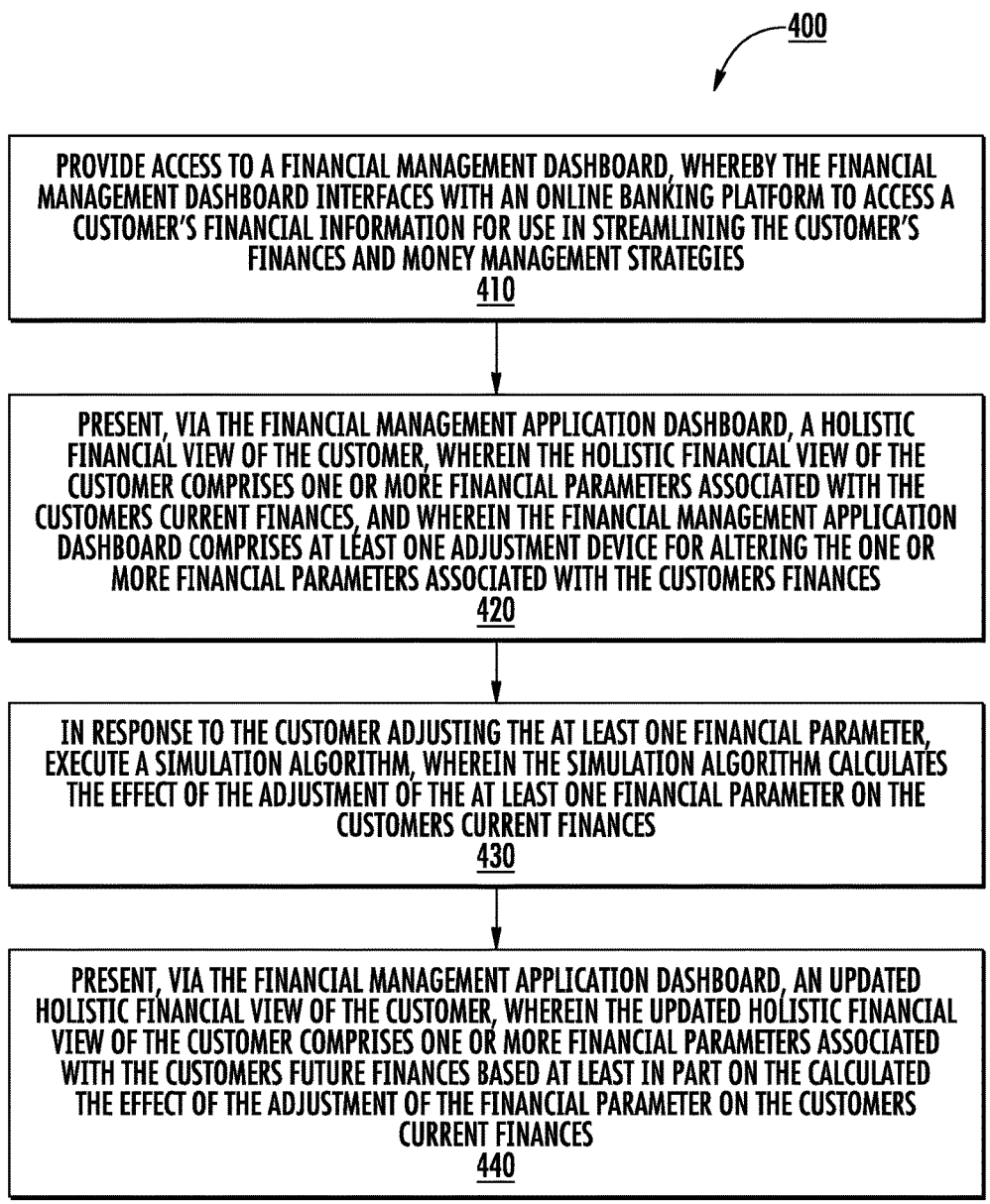
Figure 5:
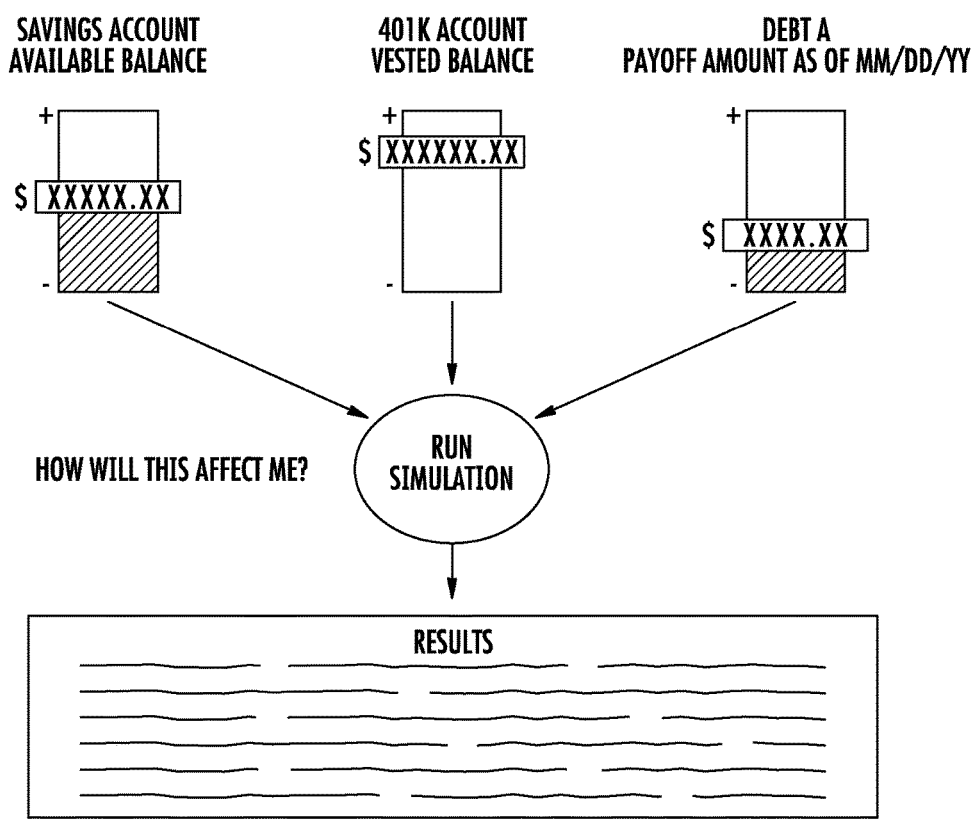
Figure 6:
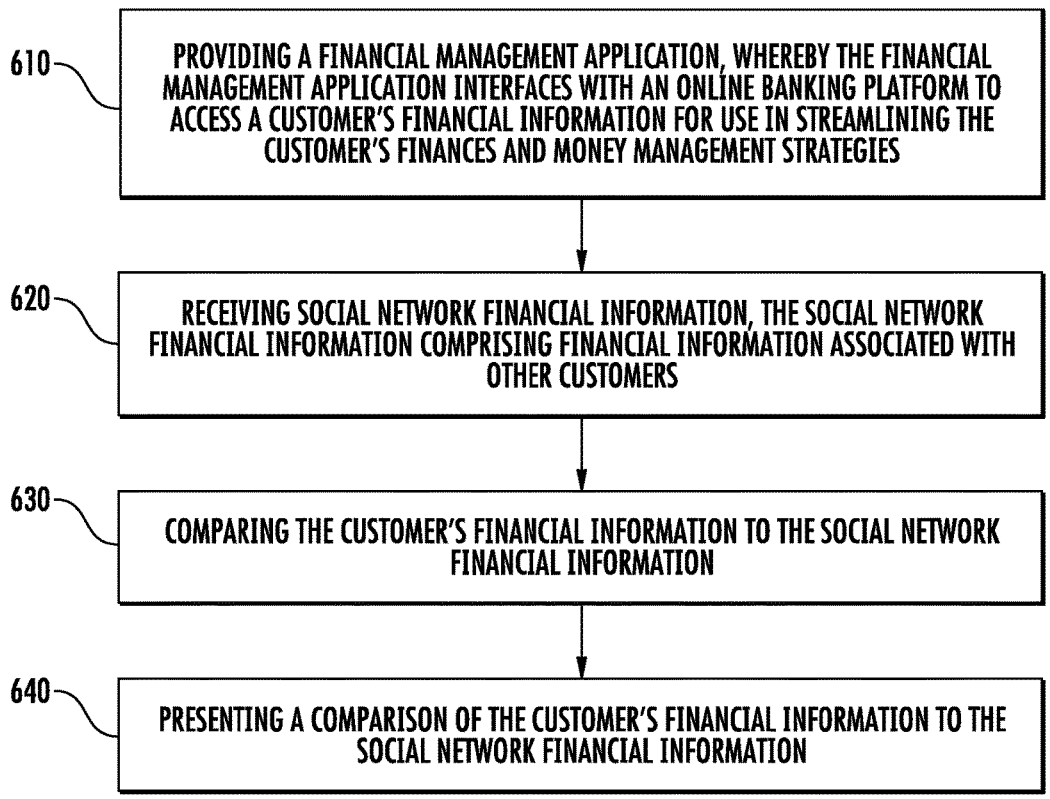
Figure 7:
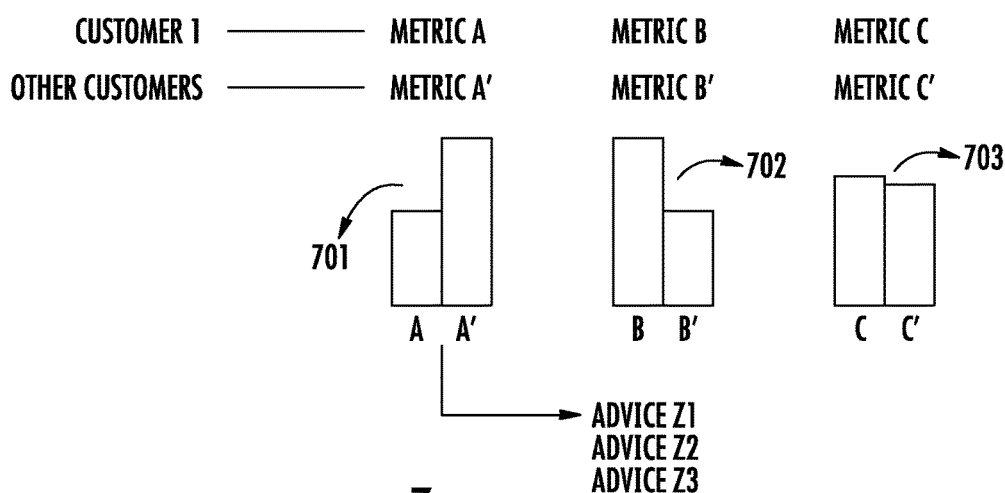
Figure 8:
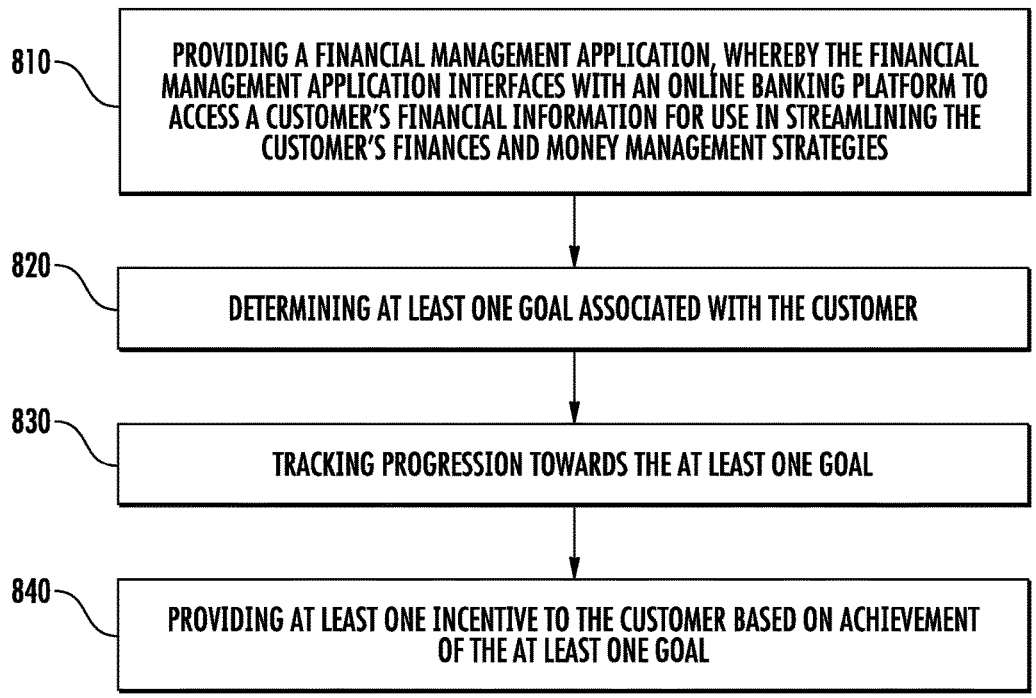
Figure 9:
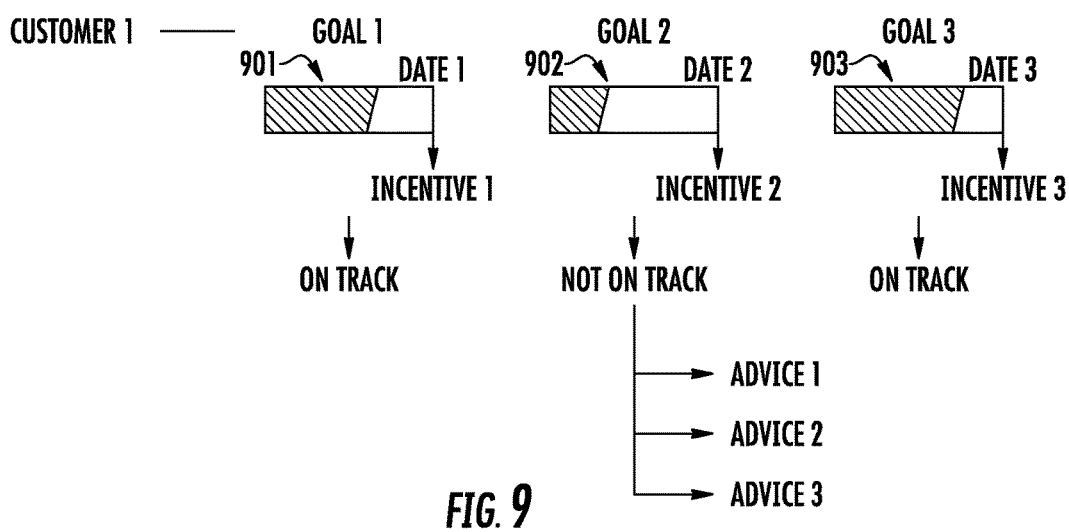
Figure 10:
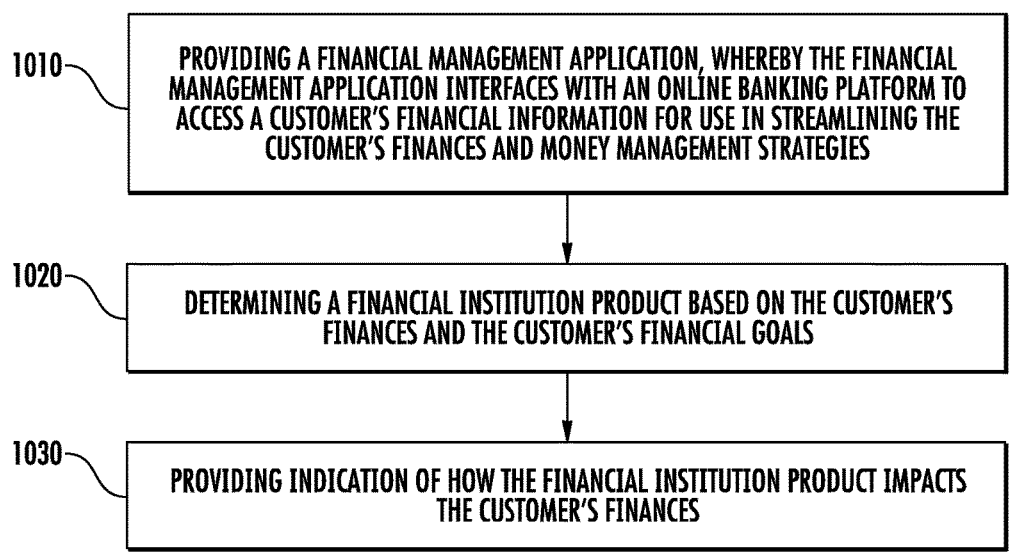
Figure 11:
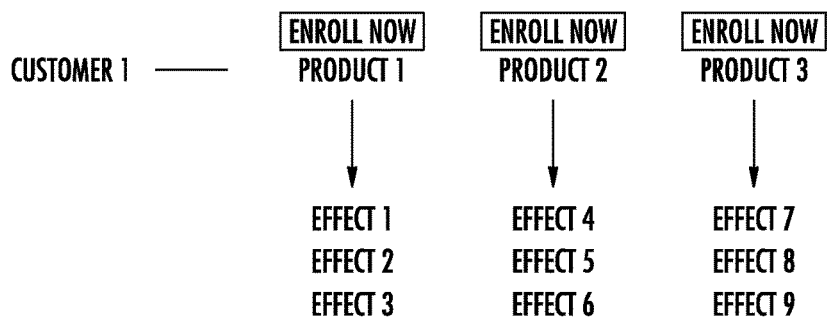

Having thus described embodiments of the invention in general terms, reference will now be made to the accompanying drawings, where:

FIG. 1 is a diagram illustrating a networking environment system, in accordance with embodiments of the present invention FIG. 2 is a high level process flow for streamlining customer finance and customer money management platforms and providing a financial institution product application overlay for customer money management, in accordance with embodiments of the present invention;

FIG. 3 is diagraph illustrating a user interface for streamlining customer finance and customer money management platforms and providing a financial institution product application overlay for customer money management, in accordance with embodiments of the present invention;

FIG. 4 is a high level process flow for streamlining customer finance and customer money management platforms and providing consequence shifting based on financial decisions or simulations, in accordance with embodiments of the present invention;

FIG. 5 is diagraph illustrating a user interface for streamlining customer finance and customer money management platforms and providing consequence shifting based on financial decisions or simulations, in accordance with embodiments of the present invention;

FIG. 6 is a high level process flow for streamlining customer finance and customer money management platforms and providing a comparison based on a social network platform, in accordance with embodiments of the present invention;

FIG. 7 is diagraph illustrating a user interface streamlining customer finance and customer money management platforms and providing a comparison based on a social network platform, in accordance with embodiments of the present invention;

FIG. 8 is a high level process flow for streamlining customer finance and customer money management platforms and providing incentives based on customer money management trends, in accordance with embodiments of the present invention;

FIG. 9 is diagraph illustrating a user interface for streamlining customer finance and customer money management platforms and providing incentives based on customer money management trends, in accordance with embodiments of the present invention;

FIG. 10 is a high level process flow for streamlining customer finance and customer money management platforms and providing a financial institution product based on customer money management trends, in accordance with embodiments of the present invention; and FIG. 11 is diagraph illustrating a user interface for streamlining customer finance and customer money management platforms and providing a financial institution product based on customer money management trends, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for use in infrastructure trending systems that proactively monitor networked environments and provide visual representations of the networked environment and recommendations for improving the networked environment. The invention enables a system to execute an electronic data collection script on one or more host machines within a networked environment, wherein the electronic data collection script queries the one or more host machines to electronically collect machine information; store the collected machine information in a storage location, whereby the machine information can be accessed, via the storage location, for use in providing infrastructure trending data; receive a request to display an infrastructure trend associated with the network environment; in response to receiving the request, analyze the collected machine information; and generate at least one graph based on the collected machine information, wherein the at least one graph displays the infrastructure trend associated with the network environment.

In some embodiments, an "entity" may refer to a business entity that is either maintaining or acting on behalf of an entity maintaining one or more databases for monitoring and data housing. For example, in exemplary embodiments, an entity may be a financial institution, or one or more parties within the financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a customer to establish an account with the entity. An "account" may be the relationship that the customer has with the entity. Examples of accounts include a deposit account, such as a transactional account (e.g., a banking account), a savings account, an investment account, a money market account, a time deposit, a demand deposit, a pre-paid account, a credit account, a non-monetary customer profile that includes only personal information associated with the customer, or the like. The account is associated with and/or maintained by the entity. In other embodiments, an entity may not be a financial institution. In still other embodiments, the entity may be the merchant itself.

In some embodiments, the "customer" or "client" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded).

Referring to FIG. 1, a network environment is illustrated in accordance with embodiments of the present invention. As illustrated in FIG. 1, the financial institution server 102 is operatively coupled via a network 101 to the user computing device 104 and/or a third party database 106. In this configuration, the financial institution server 102 may send information to and receive information from the user computing device 104 and/or the third party database 106. Additionally, the user computing device 104 may send and receive information directly from the third party database 106. The financial institution server 102 may be or include one or more network base stations or other network components. Furthermore, the financial institution server may maintain the online banking platform in addition to data associated with the online banking platform and various applications discussed herein. FIG. 1 illustrates only one example of an embodiment of a network environment 100, and it will be appreciated that in other embodiments one or more of the systems, devices, or servers may be combined into a single system, device, or server, or be made up of multiple systems, devices, or server.

The network 101 may be a global area network (GAN), such as the Internet, a wide area network (WAN), a local area network (LAN), a telecommunication network or any other type of network or combination of networks. The network 101 may provide for wire line, wireless, or a combination wire line and wireless communication between devices on the network 101.

As illustrated in FIG. 1, the financial institution server 102 generally comprises a communication device 150, a processing device 152, and a memory device 154. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combination of the foregoing. Control and signal processing functions of the system are allocated between these processing devices according to their respective capabilities. The processing device may include functionality to operate one or more software programs based on computer readable instructions thereof, which may be stored in a memory device.

The processing device 152 is operatively coupled to the communication device 150 to communicate with the network 101 and other devices on the network 101. As such, the communication device 150 generally comprises a modem, server, or other device for communicating with other devices on the network 101.

As further illustrated in FIG. 1, the network financial institution server 102 comprises computer readable instructions 158 of an application 160. In some embodiments, the memory device, 154 includes data storage 156 for storing data related to and/or used by the application 160. The application 160 may perform one or more of the steps and/or sub-steps discussed herein and/or one or more steps not discussed herein. For example, in some embodiments, the application 160 may provide financial information of the customer to the application programming interface.

As illustrated in FIG. 1, the user computing device 104 generally comprises a communication device 130, a processing device 132, and a memory device 134. The processing device 132 is operatively coupled to the communication device 130 and the memory device 134. In some embodiments, the processing device 132 may send or receive data from the user computing device 104, to the financial institution server 102 via the communication device 130 over a network 101. As such, the communication device 130 generally comprises a modem, server, or other device for communicating with other devices on the network 101.

As further illustrated in FIG. 1, the user computing device 104 comprises computer readable instructions 138 stored in the memory device 134, which in one embodiment includes the computer-readable instructions 138 of an infrastructure trending application 160. In the embodiment illustrated in FIG. 1, the application 160 allows the user computing device 104 to be linked to the financial institution server 102 to communicate, via a network 101. The application 160 may also allow the user computing device 104 to connect directly (i.e. locally or device to device) with the third party database 106 for sending and receiving information. The application 160 may perform one or more of the steps and/or sub-steps discussed herein and/or one or more steps not discussed herein. For example, in some embodiments, the application 160 may generate a graph to be presented on the display associated with the user computing device 104.

As illustrated in FIG. 1, a third party database 106 may include a communication device 110, a processing device 112, and a memory device 114. The processing device 112 is operatively coupled to the communication device 110 and the memory device 114. In some embodiments, the processing device 112 may send or receive data from the user computing device 104 and/or the financial institution server 102 via the communication device 110. Such communication may be performed either over a direct connection and/or over a network 101. As such, the communication device 110 generally comprises a modem, server, or other device for communication with other devices on the network 101.

As further illustrated in FIG. 1, the third party database 106 comprises computer-readable instructions 118 of an application 120. In the embodiment illustrated in FIG. 4, the application 120 allows the database 106 to be linked to the financial institution server 102 to communicate, via a network 101. The application 120 may also allow the user computing device 104 to connect directly (i.e., locally or device to device) with the third party database 106 or indirectly through the network 101. The application 120 may perform one or more of the steps and/or sub-steps discussed herein and/or one or more steps not discussed herein.

Any of the features described herein with respect to a particular process flow are also applicable to any other process flow. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Referring now to FIG. 2, a high level process flow to implement a comprehensive system for providing financial management of all monetary funds and debt 200 is illustrated in accordance with one embodiment of the present invention, which will be discussed in further detail throughout this specification. As illustrated, the method may comprise a plurality of steps, including but not limited to, providing a financial management application that interfaces with an online banking platform to access a customer's financial information for use in streamlining the customer's finances and money management strategies 210, receive a request to process a simulated investment, via the financial management application, wherein the request specifies a virtual investment amount and one or more financial products 220, in response to receiving the request to process a simulated investment, executing a simulation algorithm, wherein the simulated algorithm calculates the effect of virtual investment amount on the one or more financial products 230, and displaying the calculated effect of depositing the virtual investment amount into the one or more financial products 240.

At step 210, the system may first provide a financial management application that interfaces with an online banking platform, or another financial institution system, to access a customer's financial information. The exchange of information between the financial management application and the online banking platform may be utilized to streamline the customer's finances with investment data and/or investment product data for the purpose of providing recommended money management strategies. In some embodiments, the financial management application may overlay or supplement the online banking platform to provide a streamlined platform that allows a user to view both their current finances and the effect of proposed investments.

In such an embodiment, the system may provide an application programming interface (API) that is configured to push customer account information from the online banking system to the financial management application. The application programming interface may be provided by an entity responsible for issuing and/or maintaining the customer's account such as a financial institution. To this extent, the application programming interface may be additionally associated with and/or linked to at least one database and/or remote server that maintained by the entity responsible for issuing the customer's account(s). For example, in one embodiment, the customer maintains at least one account with a financial institution account such that the application programming interface is associated with at least one database maintained by the financial institution. In another embodiment, the customer may additionally have a third party financial account (e.g. investment account) or financial planning system, such that the application programming interface is associated with at least one database maintained by the third party entity.

The application programming interface may be configured to facilitate communication between the financial management application and the at least one database and/or remote server that is maintained by a customer account issuing entity. As used herein, an "application programming interface" may refer to a software interface that provides a means for a software application (e.g., the financial management application) to communicate with a remote application over a network (e.g., the Internet) through a series programming commands that call and/or invoke a routine to execute a specific process. In one embodiment, the application programming interface may communicate back and forth between the financial management application and the online banking platform through web services. As used herein "web services" may refer to a collection of technological standards and protocols by which software applications communicate over a network such as the internet (e.g. Extensible Markup Language (XML)). In some embodiments, providing the application programming interface may further comprise providing access to software programming code embodied by a series of XML messages where each message corresponds to a different function of the remove service.

In some embodiments, providing the financial management application further comprises determining a level of access for receiving account information associated with the customer. In some embodiments, the levels of access may be defined by a high, medium, and/or low access tier where the higher the access level the more information the user is able to receive and view from within the financial management application. For example, for a financial account such as a checking account, a user with a low access level may be able to only view the available balance of the account, a user with a medium access level may be able to view the available balance of the account, and the last five (5) transactions processed using the account, and a user with a high access level may be able to view the available balance of the account, the last five (5) transactions processed using the account, and any pending transactions associated with the account.

The system may be configured to receive, from the customer, one or more authentication credentials, verify the one or more authentication credentials, and in response to verifying the one or more authentication credentials, provide access to the financial management application. As such, the financial management application may be embodied as a standalone application that communicates with the online banking platform on the back end to receive customer financial information, or the financial management application may be embodied as a widget that is accessible from within the online banking portal. In some embodiments, the financial management application can be accessed by a customer via one or more authentication credentials. To this extent, in some embodiments, the level of access is determined based at least partially on the level of authentication used for authenticating the financial management application, the online banking portal, or a combination of the two. For example, if access to the financial management application or online banking portal requires a strict authentication (e.g., security question(s), biometric screening parameter, and the like) the user may receive a high access level to the financial information, and if access to the financial management application or online banking portal requires a lenient authentication (e.g., a digital wallet PIN) the user may receive a low access level to the financial information. In another embodiment, the level of access is determined based at least partially on the account types that are associated with the financial management application. For example, a user with a premium account may receive a high access level to the financial information whereas a user with a standard account may receive a medium or low access level to the financial information.

In other embodiments, providing the financial management application further comprises receiving one or more user preferences for determining the level of access for receiving customer account information. In such an embodiment, the user may define via the user preferences at least one account parameter to be included or excluded in the financial information for the purpose of providing a comprehensive money management outlook. For example, if the customer maintains a savings account from which they do not want to expend funds, the user may state in the user preferences that the available balance of the savings account should not be included in investment simulations. As such, either the user or the entity maintaining the user's account may specify types of accounts or the type of account information (e.g. available balance, transaction history, average income, average expenses, and the like) that may be pulled from the online banking platform and utilized within the financial management application. As discussed herein, user preferences may be set from within the financial management application or from within another platform associated with the financial institution such as the online banking platform. For example, a user may set toggles that define what financial information will be available and viewable from within the financial management application. If the user preferences are set from within the online banking platform then the user preferences may be subsequently pushed to the financial management application via application programming interface.

The financial information may comprise various account parameters related to the customer accounts and/or information associated with debts owed by the customer. In some embodiment, the financial information may be related to the interest and/or return rates for each of the user's financial institution accounts. The financial information may be further related to a number of debts owed by the user, the debtor or debt name, the balance of the debt(s), the standard annual percentage rate (APR), an average amount that the user pays towards the debts on a periodic basis, and the like. In some embodiments, the financial information comprises comprehensive transaction details for a predetermined number of transactions previously processed by the customer. For example, the customer may have an established investment history, and the financial information may comprise transaction details of the last five (5) investments the user has made. However, the financial information may also include general transaction details related to the customer's accounts such as checking account transactions. In some embodiments, the financial information comprises comprehensive transaction details for a predetermined number of transactions previously processed using a checking account of the customer. For example, the financial information may comprise transaction details of the last ten (10) purchases the user made with the checking account. To this extent, the financial information may include investment history, transaction purchase history, and/or trending information determined based on the user financial transaction history. In a specific example, the financial information may include the user's last five (5) transactions associated with the account which include a direct deposit from the user's employers, an automatic withdrawal to a utility company, a physical check that the user authorized, and two purchases the user made using a checking account. As such, the system may be configured to determine, based on the user's purchase history, which of a user's transactions are ad hoc and which are regular transaction. In response, to identifying ad hoc transactions, the system may determine and subsequently recommend that the funds utilized to process one or more ad hoc transactions may be better utilized towards an investment into at least one suggested financial product. In some embodiments, the financial information comprises the available balance of the customer's accounts, pending account transactions, and the like. In some embodiments, the financial information comprises one or more alerts for the account associated with a customer. For example, in one embodiment, the financial information may be associated with a user savings account, and the user may receive an alert whenever their available balance rises above a predetermined threshold that has been defined by either the user themselves or a third party (e.g. the merchant). In a specific example, the customer may be utilizing the balance from the savings account to fund an automotive purchase, and in response to determining the available balance of the account exceeds the purchase price, the user may receive an alert. The alert may then be pushed from the online banking platform to the financial management application, in which the alert may then indicate the presences of additional funds that may be better utilized in one or more alternative financial products.

At step 220, after providing a financial management application that is accessible by the customer and configured to receive the customer's financial information, the system may receive a request to process a simulated investment, via the financial management application. The request may specify a virtual investment amount and one or more financial products for use in simulating an investment based on the customer's financial information. The virtual investment amount may be defined by the customer and/or an amount that is recommended by the financial institution based on the average income and/or expenses associated with one or more of the customer's financial accounts. For example, the system may be configured to determine the average income of the customer's account, determine the average expenses of the customer's account, and determine that an amount defined by the difference between the average income and average expenses may be periodically deposited into a financial product such that it produces a greater return. In response to making such a determination, the system may be further configured to recommend the financial product to the customer. In this way, in some embodiment, the request may be associated with and/or limited to financial products that have been determined by the system to have an advantageous benefit for the customer and subsequently recommended to the customer. By doing so the customer may request to process a simulated investment utilizing the recommended financial product and be able to receive a visual display of the benefit or consequence of using one financial product as opposed to another. In some embodiments, the system may identify current financial products that are utilized by the customer (e.g. checking account, savings account), and determine one or more alternative financial products that are available to the customer based on the customer's financial information. For example, the system may determine that the user has a large sum of money in a general savings account that will accrue a higher return rate if deposited into a 401K account.

In some embodiments, the system may restrict the user from defining and/or specifying a virtual investment amount that exceeds the available balance of the user's accounts either singularly or aggregated. In other embodiment, the system may allow the user to liberally define a virtual investment amount. In one instance, the system may predefine the parameters of the simulated investment request such that a user can automatically process a simulated investment request in response to a single action (e.g. one-click button). For example, the system may predefine that recommended financial product are to be utilized in simulated investments, and the virtual investment amount may be defined by the amount of excess income that is automatically determined for the user.

The system may be configured to receive information via a user interface associated with the financial management application and in particular receive a simulated investment request on behalf of the customer. The simulated investment request may specify the virtual investment amount as defined by the user. The received information may be directly inputted into the user interface that is being presented via the financial management application. The received information may typically be provided via one or more user input devices associated with a device on which the financial management application is maintained and/or executed. The user interface may indicate the type and/or categories of information that may be received, where a portion of the information may be required, and a portion of the information may be optional. For example, the user may define a virtual investment amount and select for the financial product to be based on one or more recommendations automatically determined by the system such that the request does not require the user to explicitly define a financial product for use in the simulated investment. Methods for receiving information may include, but not be limited to, manually inputting information into the user interface and/or form using an input device, manually selecting options from one or more drop down menus, manually selecting yes or no options using selectable input methods (e.g. radio buttons, check boxes), and the like.

In some embodiments, receiving information via a user interface and/or form for requesting simulated investments may further comprise manually receiving information into one or more user input fields within the user interface and/or form for requesting simulated investments. For example, information received in the manual input fields may include the virtual investment amount, one or more financial products to be utilized, the risk tolerance of the customer, and the like. In some embodiments, the user input fields may be populated based on user input from the customer or via input from a third party financial planner or financial planning system.

In some embodiments, receiving information via the user interface and/or form for requesting simulated investments may further comprise automatically populating one or more information fields within the user interface and/or form for requesting simulated investments. The fields may be populated based on one more standards or rules that are provided by the business entity responsible for maintaining the financial management application. In some embodiments, the field is partially populated based on one or more options presented within a drop down menu in the user interface and/or form for requesting simulated investments. For example, the entity may specify via a database table one or more financial products available and/or recommended for use in simulated investment requests. The table may then be used to automatically populate a drop down menu associated with a financial product field required in the user interface and/or request form. As previously mentioned, the fields may be populated based on one more standards or rules that are provided by the business entity responsible for maintaining the financial management application. For example, an active column within the database table for simulated investment requests may specify "yes" or "no" as to whether a particular financial product is active, where active product may be utilized in simulated investment, and inactive product may be restricted from use. In this way, any financial product that is not active and/or denoted by "no" within the table may subsequently not appear within the drop down menu associated with the financial product input field specified in the user interface and/or request form. As such, the system may automatically determine that a user does not qualify for a particular financial product and may determine to mark the financial product as inactive such that it is excluded from selection within the request form drop down menu.

In some embodiments, receiving information via the user interface and/or form for requesting simulated investments may further comprise importing information into one or more fields within the user interface and/or request form. The fields may be populated based on information that is available to the business entity and either stored locally or remotely accessible by the system for the purpose to importing the information into the user interface and/or form for requesting simulated investments. For example, various items of required information may be previously known to the system based either on the financial information of the customer or based on previous investments and/or simulated investments processed by the customer. As such, the system may access the information previously known to the system and import at least portion of the information into the user interface and/or form for requesting simulated investments.

In some embodiments, receiving information within the user interface and/or form for requesting simulated investments may further comprise verifying the received information for accuracy and completion. In such an embodiment, the system may have pre-defined criteria for information that must be explicitly provided by the user such as the minimum virtual investment amount and at least one financial product. As such, the system may be further configured to review the received request and/or information provided via user input to verify that each item of required information has been provided. In an instance where one or more items of required information are determined to be missing from the received request, the system may then be configured to present an error message (in an instance where the user attempts to submit and/or save the request prior to providing the missing information) and further prompt the requesting entity to provide the missing items of information prior to submitting and/or saving the simulated investment request. In some embodiments, the request is received in response to the user saving the user input provided within the user interface such that the request will not be submitted until the missing items of required information have been provided. The system may be further configured to review the received simulated investment request to verify that each item of required information is accurate. For example, the system may verify that the inputted virtual investment amount reflects an available balance of at least one financial account maintained by the customer. In an instance where one or more items of required information are determined to be invalid, the system may then be configured to present an error message (in an instance where the user attempts to submit and/or save the simulated investment request prior to providing valid information) and further prompt the requesting entity provide the invalid items of information prior to submitting and/or saving the request.

In some embodiment receiving a request to process a simulated investment further comprises the system being configured to maintain a record/history of simulated investment request such that the history is searchable by either the entity associated with the account, the customer, or a third party entity. As such a request archive may be maintained for by the system for a predetermined time period, permanently, or until prompted to be removed by a particular entity.

At step 230, in response to receiving the request to process a simulated investment, via the financial management application, the system may execute a simulation algorithm. As illustrated in FIG. 3, the simulated algorithm may be configured to calculate the effect of the virtual investment amount on the one or more financial products. In this way, the system may predetermine the outcome if the customer were to deposit the investment amount into at least one of the financial products. It should be noted that as used herein, the term "algorithm" may refer to a single algorithm or a series of algorithms configured to work in conjunction with one another. In one embodiment, the algorithm may calculate the interest that would be earned by holding the virtual investment amount as cash in either a checking or savings account. In another embodiment, the algorithm may determine a monetary amount of interest money that is saved by paying down on one or more particular debts at an expedited rate.

In some embodiments, the algorithm may also be configured to determine the amount of money that may be potentially gained by depositing the money in a money market account based on the current status of the market and the risk tolerance level of the customer. In such an embodiment, the customer may set the algorithm to run for a predetermined period of time. As such the system may receive information associated with daily changes in the market and update the results of the algorithm according. The algorithm may be configured to continuously run for any given simulation request such that the customer may then monitor the long term effect of the virtual deposit within the proposed financial product (e.g. a money market account). In such an embodiment, the customer may specify, within the request to process the simulated investment, a time period for which the algorithm should be executed (e.g. continuously for a predetermined number of days, weeks, months, and the like). The simulation algorithm may be further configured to conduct similar simulations for other accounts and/or financial products associated with an external financial institution, where the external financial institution is not directly associated with the financial management application. As such, the system may be configured to retrieve and analyze information gathered from the external entity or financial institution for the purpose of conducting related simulations.

At step 240, after executing the simulation algorithm, the system may then display the calculated effect of depositing the virtual investment amount into the one or more financial products. In one embodiment, the system may be further configured to present at least one of an asset-debt ratio or risk-time ratio within the financial management application.

In some embodiments, the system may be configured to identify an investment opportunity based on the customer's financial information. To this extent, displaying the calculated effect may further comprise displaying a one or more identified investment opportunities, where the system may further categorize the identified opportunities based on a proposed success level for each of the identified opportunities. The proposed success level may be at least partially based on at least one of an asset-debt ratio or risk-time ratio within the financial management application.

Referring now to FIG. 4, a high level process flow to implement a comprehensive system for providing consequence shifting based on financial decisions or simulations 400 is illustrated in accordance with one embodiment of the present invention, which will be discussed in further detail throughout this specification. As illustrated, the method may comprise a plurality of steps, including but not limited to, providing access to a financial management dashboard, whereby the financial management dashboard interfaces with an online banking platform to access a customer's financial information for use in streamlining the customer's finances and money management strategies 410; presenting a holistic financial view of the customer, wherein the holistic financial view of the customer comprises one or more financial parameters associated with the customer's current finances, and wherein the financial management application dashboard comprises at least one adjustment device for altering the one or more financial parameters associated with the customer's finances 420; in response to the customer adjusting the at least one financial parameter, executing a simulation algorithm, where the simulation algorithm calculates the effect of the adjustment of the at least one financial parameter on the customer's current finances 430; and presenting an updated holistic financial view of the customer, where the updated holistic financial view of the customer comprises one or more financial parameters associated with the customer's future finances based at least in part on the calculated the effect of the adjustment of the financial parameter on the customer's current finances 440.

At step 410, the system may first provide access to a financial management dashboard. The financial management dashboard may interface with an online banking platform to access a customer's financial information for use in streamlining the customer's finances and money management strategies. The exchange of information between the financial management application and the online banking platform may be utilized to streamline the customer's finances with investment data and/or investment product data for the purpose of providing consequence shifting based on potential financial decisions of the customer. It should be noted that, as discussed herein, the financial management dashboard may be configured to perform any function of the financial management application previously discussed herein, and vice versa. To this extent, in some embodiments, the financial management dashboard may be embodied by a user interface within the financial management application.

At step 420, after providing access to a financial management dashboard, the system may present a holistic financial view of the customer. The holistic financial view of the customer may comprise one or more financial parameters associated with the customer's current finances. In an exemplary embodiment, the financial management application dashboard may comprise at least one adjustment device for altering the one or more financial parameters associated with the customer's finances. The adjustment device may refer to various user input interfaces associated with the financial management dashboard and configured to visually represent an alteration within the financial parameter. The adjustment device may include, but not be limited to, one or more levers, sliding bars, nobs, manual text input fields, and the like. In response to the user altering the adjustment device via user input, the system may receive an indication that the user has requested to alter at least one financial parameter associated with their finances, and the system may automatically provide a new visual representation of the financial parameter as it is associated with the adjustment device. For example, as illustrated in FIG. 5, the one or more financial parameters may be related to an available balance or available credit associated of a plurality of the user's accounts (e.g. checking, savings, money market, credit card, and the like), a vested balance of one or more of user's investment and/or retirement accounts, a payoff amount associated with a debt owed by the user and the like. In response to the user adjusting the lever upward, a dollar amount indicated on the lever bar may increase to indicate the amount to which the user has adjusted the financial parameter for potential simulation or consequence shifting of the user's finances.

At step 430, in response to the customer adjusting the at least one financial parameter, the system may execute a simulation algorithm. In this way, the system may be configured to receive, via the financial management application dashboard, user input from the customer, wherein the user input comprises the customer adjusting at least one financial parameter using the at least one adjustment device. The simulation algorithm may be configured to calculate the effect of the adjustment of the at least one financial parameter on the customer's current finances. In this way, the system may predetermine the outcome or long term effect if the customer were to, for example, increase the available balance associated with their savings account and decrease the amount owed on a particular debt. It should be noted that as used herein, the term "algorithm" may refer to a single algorithm or a series of algorithms configured to work in conjunction with one another. In one embodiment, the algorithm may calculate the interest that would be saved in the long term by decreasing the debt owed on particular account. In another embodiment, the algorithm may equate the interest save to a monetary amount and determine the monetary amount of interest money that is saved by paying down on one or more particular debts at an expedited rate. To this extent, in some embodiments, in addition to adjusting parameters associated with the customer's general finances the system may provide at least one adjustment device for altering a time period associated with the customer's finances such as the period of time in which an amount of money will be saved or the period of time in which a debt will be paid off.

In some embodiments, the algorithm may also be configured to determine the amount of money that may be potentially gained by depositing the money in a money market account based on the current status of the market and the risk tolerance level of the customer. In such an embodiment, the user may set the algorithm to run for a predetermined period of time. As such the system may receive information associated with daily changes in the market and update the results of the algorithm according. The algorithm may be configured to continuously run for any given simulation requests such that the user may then monitor the long term effect of altering the one or more financial parameters. In such an embodiment, the user may specify, within the request to process the simulated investment, a time period for which the algorithm should be executed (e.g. continuously for a predetermined number of days, weeks, months, and the like).

At step 440, after executing the simulation algorithm, the system may then present an updated holistic financial view of the customer. The updated holistic financial view of the customer may comprise one or more financial parameters associated with the customer's future finances based at least in part on the calculated the effect of the adjustment of the financial parameter on the customer's current finances. In one embodiment, the system may be further configured to present a future view of the customer's financial based on predetermined stages or periods of time (e.g. one year, two years, five years, and the like), where the predetermined stage may indicate that the customer has reached retirement age, graduated from school, had a child, and the like. The future view may be partially based on the adjustment of the one or more financial parameters in addition to the normal financial habits of the customer. In one embodiment, the system may automatically determine the normal financial habits of the customer based on the customer's financial history. For example, the system may analyze the customer's financial transaction history to identify one or more trends and determine the customer's normal financial habits based on the identified trends.

As defined herein, customer information or customer financial information includes a tolerance/time/asset/obligation view. This view considers the assets of the customer, the obligations of the customer (and the times when those obligations are due), the time frame for constructing the view, and provides the tolerance during the time frame for various financial decisions (e.g., purchases, payments, withdrawals, or the like) made by the customer from the customer's financial account. The tolerance indicates whether the customer's financial goals can be maintained based on the execution of certain financial decisions (e.g., opening a trading account, spending more on a particular activity, or the like).

Referring now to FIG. 6, further embodiments of the invention are directed to social aggregation for customer money management. A dashboard is provided with a holistic financial view of a customer. Examples of this dashboard are provided later in the specification. Referring now to FIG. 6, FIG. 6 presents a method for social aggregation for customer money management. At block 610, the method comprises providing a financial management application, whereby the financial management application interfaces with an online banking platform to access a customer's financial information for use in streamlining the customer's finances and money management strategies. At block 620, the method comprises receiving social network financial information, the social network financial information comprising financial information associated with other customers. The social network financial information may be obtained from a social network or from a financial institution network. At block 630, the method comprises comparing the customer's financial information to the social network financial information. At block 640, the method comprises presenting a comparison of the customer's financial information to the social network financial information. The comparison may be presented graphically (e.g., pie charts, bar graphs, or the like).

In some embodiments, the method comprises receiving a financial decision from the customer, and determining an impact of the financial decision on the customer's financial information. The decision may be a decision to spend more on a particular event, save a larger sum each month, or the like. The impact may be the impact on the customer's current or future financial goals, savings, payments, or the like.

In some embodiments, the social network financial information comprises information associated with other customers that are substantially similar to the customer. The other customers may be connected to the customer on a social network (e.g., directly connected or indirectly connected via other social network connections), or may not be connected to the customer at all on the social network. The other customers are substantially similar to the customer when a customer from the other customers is of substantially similar age, has a substantially similar job, has a substantially similar number of family members, or lives in the same neighborhood. However, the invention is not limited to these examples of similarity. The social network information may be presented in an aggregate view so that other customers' information is not visible to the customer. The customer is able to filter through the social network information based on criteria defined by the customer (e.g., by geographical position).

In some embodiments, the method is configured to indicate whether the customer is performing better or worse compared to the social network financial information (e.g., another customer that is connected or not connected to the customer on a social network) at the present time, in the past, or at a particular time in the future. The customer's performance is based on financial savings, financial goals, or financial payments (i.e., any financial metrics). The present invention also indicates how the customer can improve the customer's performance compared to the social network financial information (e.g., other customers connected or not connected to the customer on a social network). For example, the invention suggests to the customer that the customer can reduce the spending on a particular activity for the next couple of months.

Referring now to FIG. 7, further embodiments of the invention are directed to a user interface for social aggregation for customer money management. FIG. 7 presents Customer 1 and Metric A, Metric B, and Metric C (numerical values) associated with Customer 1. These metrics are numerical values associated with financial savings, goals, or payments. FIG. 7 also presents Metric A', Metric B', and Metric C' (numerical values) associated with Other Customers. Furthermore, FIG. 7 presents histograms 701, 702, and 703 comparing the metrics for Customer 1 with the Other Customers. As indicated by histograms 702 and 703, Customer 1 is performing better than the Other Customers on Metric B and Metric C. However, as indicated by histogram 701, Customer 1 is performing worse than the Other Customers on Metric A. Since Customer 1 is performing worse than the Other Customers on Metric A, Advice Z1, Z2, and Z3 are presented to Customer 1. Advice Z1, Z2, and Z3 are suggested steps which, if adopted by Customer 1, will bring Customer 1 back in line with the Other Customers on Metric A.

Referring now to FIG. 8, further embodiments of the invention are directed to incentive provision based on customer money management trends. Referring now to FIG. 8, FIG. 8 presents a method for incentive provision based on customer money management trends. At block 810, the method comprises providing a financial management application, whereby the financial management application interfaces with an online banking platform to access a customer's financial information for use in streamlining the customer's finances and money management strategies. At block 820, the method comprises determining at least one goal (e.g., a financial goal such as financial savings or financial payment) associated with the customer. The goal may be defined by the customer, and may be determined based on a sampling of customers that are substantially similar to the customer (e.g., similar job, age, family members, locality, or the like). In some embodiments, the goal may be determined based on social network information received from connections associated with the customer or based on social network activity of the customer (e.g., a statement made by the customer or the customer's social network connections on the social network). At block 830, the method comprises tracking progression towards the at least one goal. At block 840, the method comprises providing at least one incentive to the customer based on achievement of the at least one goal. The incentive may be associated with points, rewards, or discounts on a product. The product may be a financial institution product (e.g., an interest rate associated with a loan) or a non-financial institution product (e.g., a discount at a grocery store or eatery). The chosen non-financial institution product may be based on transaction history over a defined period of time associated with the customer (e.g., a discount associated with an eatery at which the customer made a purchase more than a threshold number of times in a defined period). The product may also be based on social network activity of the customer (e.g., a statement made by the customer or the customer's social network connections about a particular product on a social network).

In some embodiments, the method comprises monitoring at least one trend (or activity or event) associated with the customer's financial information, and providing advice to the customer if the at least one trend negatively affects achievement of the at least one goal. The advice may be provided to the customer substantially immediately (e.g., via a mobile device text message) after the trend begins to negatively affect the customer's financial information. For example, in a particular month, a customer may spend more than the budgeted amount on a particular expense (e.g., gaming and entertainment). The provided advice guides the customer on how to return on track to achieve the at least one goal. For example, the provided advice to the customer is to spend less than the budgeted amount on gaming and entertainment for the next month. Alternatively, the provided advice to the customer may be to spend less than the budgeted amount on a different expense or activity (i.e., not gaming and entertainment). If the customer disagrees with the provided advice, the customer may prompt for alternate advice.

Referring now to FIG. 9, further embodiments of the invention are directed to a user interface for incentive provision based on customer money management trends. FIG. 9 presents Customer 1, and Goal 1, Goal 2, and Goal 3 for Customer 1. These goals are any kind of financial goals (e.g., savings, payments, or the like) either defined by the customer or chosen for the customer based on the customer's financial information and/or other social network information (e.g., based on the customer's social network connections' social network activity or statements or the customer's social network activity or statements) as described herein. As indicated in FIG. 9, the target completion dates for Goal 1, 2, and 3 are Dates 1, 2, and 3, respectively. If Goals 1, 2, and 3 are achieved by the target completion dates, Customer 1 will receive Incentives 1, 2, and 3, respectively. Bar graphs are presented indicating the progress towards these goals. As indicated in FIG. 9, Customer 1 is on track to complete Goals 1 and 3 by their target completion dates. However, Customer 1 is not on track to complete Goal 2 by the target completion date. Therefore, Advice 1, 2, and 3 are presented to Customer 1. If Customer 1 adopts at least one of or all of Advice 1, 2, and 3, Customer 1 will be back on track to complete Goal 2 by the target completion date.

Referring now to FIG. 10, further embodiments of the invention are directed to provision of financial institution products based on customer money management trends. Referring now to FIG. 10, FIG. 10 presents a method for provision of financial institution products based on customer money management trends. At block 1010, the method comprises providing a financial management application, whereby the financial management application interfaces with an online banking platform to access a customer's financial information for use in streamlining the customer's finances and money management strategies. At block 1020, the method comprises determining a financial institution product (e.g., a loan, a credit or debit account, a trading account, or the like) based on the customer's finances and the customer's financial goals (e.g., a payment, a savings, or the like). For example, the financial institution product may be a trading account, and may be recommended to the customer based on the customer's finances being greater than a threshold level. In some embodiments, the financial institution product is determined based on social network information of the customer (e.g., the customer indicated a desire to buy a house or the customer's social network connections advised the customer to buy a house, or the customer indicated a change in physical location, and therefore a mortgage loan maybe recommended to the customer). In some embodiments, the customer may already have been previously enrolled in the financial institution product, and the method comprises adjusting a feature (e.g., decreasing an interest rate) associated with the financial institution product (e.g., a loan). At block 1030, the method comprises providing an indication of how the financial institution product impacts the customer's finances (and/or the customer's financial goals). For example, the indication shows the customer how the customer is able to reach the customer's financial goals in a quicker duration, thereby positively impacting the customer's finances. Additionally, the suggested product is a product that enables the customer to accomplish higher financial goals or more efficiently manage the customer's finances. The method may also prompt the customer to accept an offer associated with the product and thereby enroll the customer into the product. As described herein, a financial institution product may also refer to a non-financial institution product. Therefore, the present invention is not limited to provision of any particular types of products. In some embodiments, the product may be based on the transaction history or account history of the customer's financial account, or may be based on social network information of the customer.

Referring now to FIG. 11, further embodiments of the invention are directed to a user interface for provision of financial institution products based on customer money management trends. FIG. 11 presents Customer 1, and Products 1, 2, and 3 for Customer 1. Options are presented to Customer 1 to enroll in Products 1, 2, and 3. The effects (i.e., benefits) for Products 1, 2, and 3 are also listed (Effects 1, 2, and 3 for Product 1, Effects 4, 5, and 6 for Product 2, and Effects 7, 8, and 9 for Product 3).

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for use in providing electronic financial management, whereby the apparatus streamlines customer finance and customer money management platforms and provides a comparison based on a social network platform, the apparatus comprising:
   at least one memory; and
   a processing device operatively coupled to the at least one memory, wherein the processing device is configured to:
   provide a financial management application for installation on a customer device associated with a customer, whereby the financial management application interfaces with an online banking application to access financial information of the customer for use in streamlining finances and money management strategies of the customer;
   determine a level of authentication required to access the financial management application and the online banking application, wherein the level of authentication required to access the financial management application and the online banking application is lenient authentication;
   electronically receive one or more authentication credentials from the customer, wherein the one or more authentication credentials are associated with the financial management application and the online banking application;
   validate the one or more authentication credentials, wherein validating further comprises determining that the one or more authentication credentials meet the level of authentication required to access the financial management application and online banking application;
   determine a level of authentication required to access the financial information of the customer, wherein the level of authentication required to access the financial information of the customer is strict authentication;
   determine that the level of authentication required to access the financial information of the customer is higher than the level of authentication required to access the financial management application and the online banking application;
   determine a portion of the financial information to be displayed on the customer device, wherein determining further comprises restricting the financial information based on at least the level of authentication required to access the financial management application and the online banking application;
   initiate a presentation of a first user interface for display on the customer device, wherein the first user interface comprises at least the portion of the financial information;
   execute an electronic data collection script, via the customer device, on one or more host machines within a networked environment, wherein the electronic data collection script queries the one or more host machines to electronically collect social network financial information, the social network financial information comprising financial information associated with other customers;
   compare the financial information of the customer to the social network financial information;
   present a comparison of the financial information of the customer to the social network financial information.

2. The apparatus of claim 1, wherein the processing device is further configured to: receive a financial decision from the customer, and determine an impact of the financial decision on the financial information.

3. The apparatus of claim 1, wherein the social network financial information comprises information associated with other customers that are substantially similar to the customer.

4. The apparatus of claim 3, wherein the other customers are substantially similar to the customer when a customer from the other customers is of substantially similar age, has a substantially similar job, has a substantially similar number of family members, or lives in a same neighborhood.

5. The apparatus of claim 1, wherein the processing device is further configured to indicate whether the customer is performing better or worse compared to the social network financial information at a present time, at a past time, or at a future time.

6. The apparatus of claim 5, wherein the customer's performance is based on financial savings, financial goals, or financial payments.

7. The apparatus of claim 5, wherein the processing device is configured to indicate how the customer can improve the customer's performance compared to the social network financial information.

8. A computer program product for use in providing electronic financial management, whereby the computer program product implements a process for streamlining customer finance and customer money management platforms and provides a comparison based on a social network platform, the computer program product comprising:
   a non-transitory computer-readable medium comprising a set of codes for causing a computer to:
   provide a financial management application for installation on a customer device associated with a customer, whereby the financial management application interfaces with an online banking application to access financial information of the customer for use in streamlining finances and money management strategies of the customer;
   determine a level of authentication required to access the financial management application and the online banking application, wherein the level of authentication required to access the financial management application and the online banking application is lenient authentication;
   electronically receive one or more authentication credentials from the customer, wherein the one or more authentication credentials are associated with the financial management application and the online banking application;

validate the one or more authentication credentials, wherein validating further comprises determining that the one or more authentication credentials meet the level of authentication required to access the financial management application and online banking application;

determine a level of authentication required to access the financial information of the customer, wherein the level of authentication required to access the financial information of the customer is strict authentication;

determine that the level of authentication required to access the financial information of the customer is higher than the level of authentication required to access the financial management application and the online banking application;

determine a portion of the financial information to be displayed on the customer device, wherein determining further comprises restricting the financial information based on at least the level of authentication required to access the financial management application and the online banking application;

initiate a presentation of a first user interface for display on the customer device, wherein the first user interface comprises at least the portion of the financial information;

execute an electronic data collection script, via the customer device, on one or more host machines within a networked environment, wherein the electronic data collection script queries the one or more host machines to electronically collect social network financial information, the social network financial information comprising financial information associated with other customers;

compare the financial information of the customer to the social network financial information;

present a comparison of the financial information of the customer to the social network financial information.

9. The computer program product of claim 8, wherein the one or more set of codes further causes a computer to: receive a financial decision from the customer, and determine an impact of the financial decision on the financial information.

10. The computer program product of claim 8, wherein the social network financial information comprises information associated with other customers that are substantially similar to the customer.

11. The computer program product of claim 10, wherein the other customers are substantially similar to the customer when a customer from the other customers is of substantially similar age, has a substantially similar job, has a substantially similar number of family members, or lives in a same neighborhood.

12. The computer program product of claim 8, wherein the one or more set of codes further causes a computer to indicate whether the customer is performing better or worse compared to the social network financial information at a present time, a past time, or at a future time.

13. The computer program product of claim 12, wherein the customer's performance is based on financial savings, financial goals, or financial payments.

14. The computer program product of claim 12, wherein the one or more set of codes further causes a computer to indicate how the customer can improve the customer's performance compared to the social network financial information.

15. A method for use in providing electronic financial management, whereby customer finance and customer money management platforms are streamlined with one another and a comparison is provided based on a social network platform, the method comprising:

providing a financial management application for installation on a customer device associated with a customer, whereby the financial management application interfaces with an online banking application to access financial information of the customer for use in streamlining finances and money management strategies of the customer;

determining a level of authentication required to access the financial management application and the online banking application, wherein the level of authentication required to access the financial management application and the online banking application is lenient authentication;

electronically receiving one or more authentication credentials from the customer, wherein the one or more authentication credentials are associated with the financial management application and the online banking application;

validating the one or more authentication credentials, wherein validating further comprises determining that the one or more authentication credentials meet the level of authentication required to access the financial management application and online banking application;

determining a level of authentication required to access the financial information of the customer, wherein the level of authentication required to access the financial information of the customer is strict authentication;

determining that the level of authentication required to access the financial information of the customer is higher than the level of authentication required to access the financial management application and the online banking application;

determining a portion of the financial information to be displayed on the customer device, wherein determining further comprises restricting the financial information based on at least the level of authentication required to access the financial management application and the online banking application;

initiating a presentation of a first user interface for display on the customer device, wherein the first user interface comprises at least the portion of the financial information;

executing an electronic data collection script, via the customer device, on one or more host machines within a networked environment, wherein the electronic data collection script queries the one or more host machines to electronically collect social network financial information, the social network financial information comprising financial information associated with other customers;

comparing the financial information of the customer to the social network financial information;

presenting a comparison of the financial information of the customer to the social network financial information.

16. The method of claim 15, wherein the method further comprises receiving a financial decision from the customer, and determine an impact of the financial decision on the financial information.

17. The method of claim 15, wherein the social network financial information comprises information associated with other customers that are substantially similar to the customer.

18. The method of claim 17, wherein the other customers are substantially similar to the customer when a customer from the other customers is of substantially similar age, has a substantially similar job, has a substantially similar number of family members, or lives in a same neighborhood.

19. The method of claim 15, wherein the method further comprises indicating whether the customer is performing better or worse compared to the social network financial information at a present time, at a past time, or at a future time.

20. The method of claim 19, wherein the customer's performance is based on financial savings, financial goals, or financial payments, and wherein the method further comprises indicating how the customer can improve the customer's performance compared to the social network financial information.

* * * * *